(12) United States Patent
Petrov

(10) Patent No.: US 11,898,624 B2
(45) Date of Patent: Feb. 13, 2024

(54) TWO-SPEED GEARBOX FOR AN ELECTRIC MOTOR

(71) Applicant: Volvo Car Corporation, Gothenburg (SE)

(72) Inventor: Peter Petrov, Angered (SE)

(73) Assignee: Volvo Car Corporation, Gothenburg (SE)

( * ) Notice: Subject to any disclaimer, the term of this patent is extended or adjusted under 35 U.S.C. 154(b) by 57 days.

(21) Appl. No.: 17/526,029

(22) Filed: Nov. 15, 2021

(65) Prior Publication Data

US 2022/0154805 A1 May 19, 2022

(30) Foreign Application Priority Data

Nov. 19, 2020 (EP) .................................. 20208649

(51) Int. Cl.
*F16H 3/089* (2006.01)
*F16H 57/023* (2012.01)
*F16H 57/02* (2012.01)

(52) U.S. Cl.
CPC ........... *F16H 3/089* (2013.01); *F16H 57/023* (2013.01); *F16H 2057/02034* (2013.01); *F16H 2200/0021* (2013.01); *F16H 2200/0034* (2013.01); *F16H 2200/2035* (2013.01)

(58) Field of Classification Search
CPC ... F16H 2003/0818; F16H 2057/02034; F16H 2057/02043; F16H 2200/0021; F16H 2200/0034; F16H 3/091; F16H 57/023; F16H 57/021; F16H 2061/0046; F16H 61/30; F16H 2061/308; F16H 61/705; H02K 7/108; H02K 7/116; F16D 13/00
See application file for complete search history.

(56) References Cited

U.S. PATENT DOCUMENTS

| | | | |
|---|---|---|---|
| 6,790,154 B1 * | 9/2004 | Kelley, Jr. ............. | F16H 48/295 475/150 |
| 11,207,962 B2 * | 12/2021 | Engerman ............. | F16H 37/042 |
| 11,415,208 B2 * | 8/2022 | Engerman ............... | F16D 25/06 |

(Continued)

FOREIGN PATENT DOCUMENTS

| | | | | |
|---|---|---|---|---|
| DE | 19917724 A1 * | 11/2000 | ............... | B60K 1/00 |
| DE | 202011102648 U1 * | 1/2012 | .......... | B60L 15/2054 |

(Continued)

OTHER PUBLICATIONS

May 17, 2021 European Search Report issued in International Application No. 20208649.

*Primary Examiner* — Joseph Brown

(74) *Attorney, Agent, or Firm* — Clements Bernard Walker; Christopher L. Bernard

(57) ABSTRACT

An assembly for use with an electric motor, including a shaft with on a first end and on a second end a rotatable gear. Each gear is fixedly connected to a first clutch member that can slipping engage a second clutch member extending around the shaft and connected to the shaft in a fixed angular position. A force member is axially situated between the clutch members for moving second clutch members relative to the first clutch members in an axial direction such that the first clutch members and the second clutch members can engage and disengage in a slipping manner at relative circumferential speeds.

14 Claims, 3 Drawing Sheets

(56) References Cited

U.S. PATENT DOCUMENTS

| | | | | |
|---|---|---|---|---|
| 2013/0296129 A1* | 11/2013 | Itakura | ........... | B60W 10/02 |
| | | | | 477/8 |
| 2013/0305861 A1* | 11/2013 | Ruehle | ........... | F16D 25/082 |
| | | | | 192/66.1 |
| 2017/0204940 A1* | 7/2017 | Tseng | ........... | F16D 13/76 |
| 2017/0204941 A1* | 7/2017 | Tseng | ........... | F16D 13/76 |
| 2018/0266497 A1 | 9/2018 | Herman et al. | | |
| 2020/0106337 A1* | 4/2020 | Devaraj | ........... | B60K 17/354 |
| 2020/0292042 A1* | 9/2020 | Engerman | ........... | F16D 25/06 |
| 2021/0039487 A1* | 2/2021 | Engerman | ........... | B60K 1/00 |

FOREIGN PATENT DOCUMENTS

| | | | | |
|---|---|---|---|---|
| EP | 2151602 A1 | 2/2010 | | |
| EP | 3428480 A2 | 1/2019 | | |
| EP | 3428480 A3 | 3/2019 | | |
| WO | WO-2019152065 A1 * | 8/2019 | ........... | B60K 1/00 |

\* cited by examiner

TWO-SPEED GEARBOX FOR AN ELECTRIC MOTOR

CROSS-REFERENCE TO RELATED APPLICATION

The present disclosure claims the benefit of priority of co-pending European Patent Application No. 20208649.2, filed on Nov. 19, 2020, and entitled "Two-Speed Gearbox for an Electric Motor," the contents of which are incorporated in full by reference herein.

TECHNICAL FIELD

The disclosure relates to a gear assembly for use with an electric motor, comprising a shaft with a gear both on a first end and on a second end, each gear connected to a respective clutch, the clutch comprising a first and a second clutch member, the gear assembly comprising a force member for axially moving the first clutch members relative to the second clutch members in an axial direction for slipping engaging and disengaging at relative circumferential speeds.

The disclosure also relates to an interconnecting plate for use in a gear assembly and to an electric vehicle comprising such a gear assembly.

BACKGROUND

Currently, most Electric Vehicles (EVs) have a single-speed gear reducer to transfer torque from the electric motor to the wheels. Providing a 2-speed gearbox for EV applications can reduce the overall cost of the system. Also, a 2-speed gearbox enables higher flexibility, allowing the use of a small electric motor obtaining both a high wheel torque and a high maximum vehicle speed.

For EV applications having two or more transmissions, the most suitable shifting strategy is the so-called power shift, i.e. shifting without torque interruption, which is especially important for premium vehicles. Power shift can be achieved using two wet clutches, one of which governs gear 1 and the other gear 2. There is a constraint for the position where these clutches can be placed in a gearbox because placing them on the input shaft is unfavorable due to too high speeds at which oil is forced out due to too high centrifugal forces. Therefore, a suitable place for both clutches is on an intermediate shaft (lay shaft) in a typically offset electric drive gearbox.

An electric motor is known with a main shaft having at each end a gear that engages with a respective gear on a parallel lay shaft via two transmissions. The parallel shaft is coupled to the differential. Each gear on the intermediate shaft is provided with a respective transmission and clutch of the wet multiple disc type.

The known layout requires a relatively large volume in the radial direction. The actuation of the clutches requires a relatively large volume.

It is an object of the present disclosure to provide a gear assembly for use with an electric motor, of compact dimensions. It is a further object to provide a gear assembly that is easily assembled and that can be easily taken apart for maintenance or repair. It is another object to provide a gear assembly which allows a shifting of gears with a controlled transfer of torque.

SUMMARY

Hereto a gear assembly according to the disclosure is provided for use with an electric motor including a shaft with a rotatable gear both on a first end and on a second end, each gear connected to a first clutch member fixedly connected to the gear, and the first clutch member being connectable to a second clutch member extending around the shaft and connected to the shaft in a fixed angular position, a force member being axially situated between the clutch members for axially moving the second clutch members relative to the first clutch members in an axial direction such that the first clutch members and the second clutch members can engage and disengage in a slipping manner at relative circumferential speeds.

By situating the force member between the clutches, a compact construction is obtained which allows gear shifting at substantially constant torque. The position of the force member between the clutches allows two identical force members to be used, such that cost can be reduced.

In an embodiment, the shaft is supported by bearings at each end of the shaft near a respective gear. The close proximity of the gears to the bearings of the shaft results in reduced bending of the shaft. This provides better meshing contact of the gear teeth and results in reduced noise and wear.

The second clutch members preferably extend around the shaft and are situated closer to a midpoint of the shaft than the gears.

The clutch members do not create any radial forces on the shaft and act only in the axial direction. This allows the clutch members to be situated near the midpoint of the shaft, at a relatively large distance from the bearings.

An embodiment of a gear assembly according to the disclosure includes a controller connected to the force member and adapted for actuating the force member in such a manner that one of the second clutch members engages with its corresponding first clutch member while the other of the second clutch members disengages from its corresponding first clutch member such that a transfer of torque from the gears to the axle is substantially constant.

The controller can include an oil pressure control circuit which governs clutch engagement and disengagement. Such controllers are known, for instance from dual clutch transmissions (DCTs) and conventional planetary gear automatic gearboxes. In the gear shifting process, the clutch that is engaged with the gear which is supposed to be disconnected, starts to slip by smoothly decreasing the oil pressure while simultaneously, the other clutch which is about to engage with the other gear is smoothly engaged by increasing of the oil pressure, until all the torque is passed from one gear to the other. By this means, torque is transferred with no or at most a very small, unnoticeable interruption during the shifting event.

The force member may include for each second clutch member a hydraulic actuator that is operated by the control circuit.

The gear assembly can be placed in a housing having a first and a second housing segment and an interconnecting plate situated at an interface between the housing segments, the interconnecting plate supporting the hydraulic actuators.

The interconnecting plate including hydraulic actuating cylinders is clamped between the housing segments. It can be easily mounted and released for maintenance and repair of the cylinders. Hydraulic cylinders can be integrated in the interconnecting plate by directly machining the cylinders in the form of ring-shaped grooves in the cast blank. In addition, all the oil feed channels can also be integrated by drilling in the metal interconnecting plate.

The interconnecting plate may be clamped between the motor housing and the gearbox housing so that a single set of connectors can be used to join all 3 structural parts. In that case for instance relatively long bolts can be used. This provides a more efficient way of connecting the plate compared to the use of separate dedicated bolts.

BRIEF DESCRIPTION OF THE DRAWINGS

An embodiment of a gear assembly according to the disclosure will, by way of non-limiting example, be described in detail with reference to the accompanying drawings. In the drawings.

DESCRIPTION OF EMBODIMENTS

Figure 1:
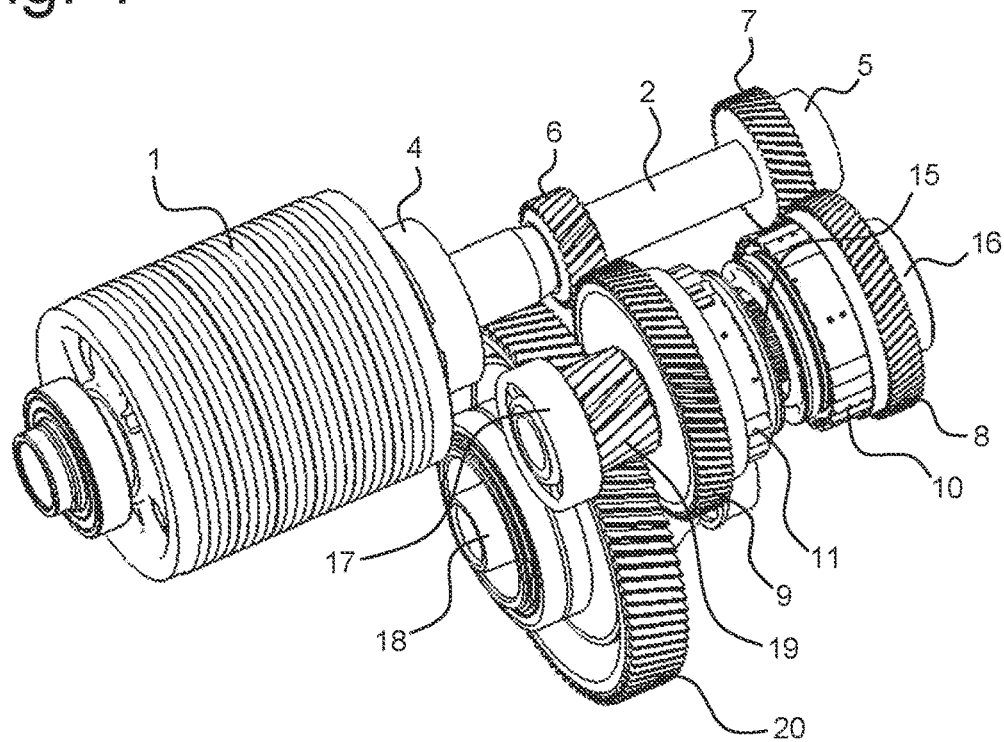
FIG. 1 shows a perspective view of an electromotor and a gear assembly according to the disclosure.

FIG. 1 shows an electric motor 1 including a driving shaft 2 that is mounted in bearings 4, 5. The driving shaft 2 has fixed thereon gears 6,7 of the first stage of the gearbox, which mesh with matching gears 8,9 of the first stage. The gears 8,9 can freely rotate about an intermediate, or lay shaft 15 and can via wet clutches 10,11 be engaged with the shaft 15, that is supported by bearings 16, 17. The intermediate shaft 15 drives gears 19 and 20 of a second or final stage, acting on an output shaft 18 which may for instance connect to a differential of the wheels. The rotational speed of the intermediate shaft 15 is between about 1.5 and 2.5 times lower than the rotational speed of the driving shaft 2.

Figure 2:
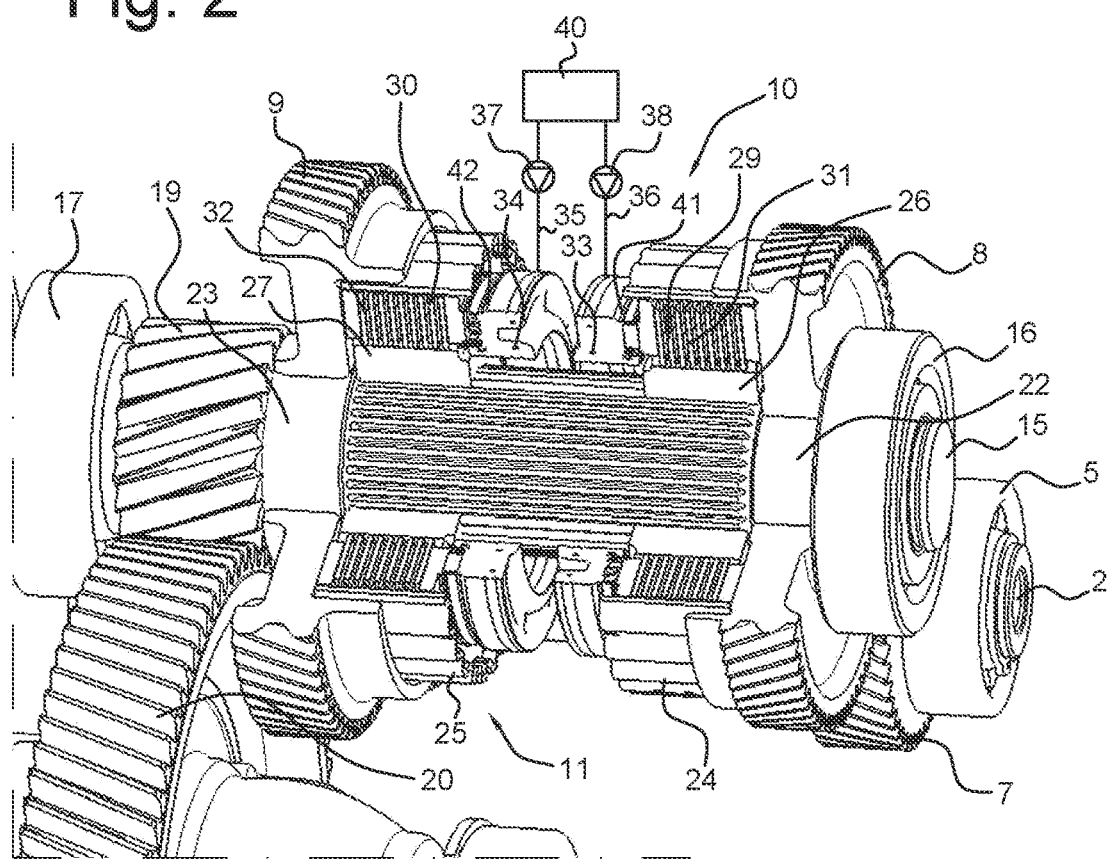
FIG. 2 shows the gears and clutches on an intermediate shaft according to the disclosure.

FIG. 2 shows the clutches 10, 11 on the intermediate shaft 15. The gears 8,9 are mounted on the shaft 15 via a clearance fit 22, 23, so that they can freely spin. The outer drums 24, 25 of each clutch 10, 11 are fixedly connected to the gears 8,9. The inner drums 26, 27 of the clutches 10, 11 are connected to the shaft 15 via splines in a fixed angular position. The inner drums 26, 27 include radial plates, or clutch discs 29, 30 that are adjacent and intermeshing with clutch discs 31, 32 of the outer drums 24,25.

By compression of the stacks of adjacent clutch discs 29,31 and 30,32 of the inner and outer drums 24,26; 25,27 in the axial direction, via rings 33,34, the stacks of discs 30,32 and 29,31 of the clutches 10, 11 will after initially slipping, engage the rotating shaft 15 with one of the gears 8, 9 when the axial force that is exerted by the rings 33, 34 is large enough.

As schematically indicated in FIG. 2, the rings 33, 34 are actuated by oil pressure in ducts 35, 36 that is generated by hydraulic actuators 37,38, that may for instance include hydraulic cylinders and pistons and that are controlled by controller 40. The rings 33, 34 form pistons that are accommodated in a respective annular groove 51, 52 of an interconnecting plate 46 of the housing of the gear box and are in fluid-tight contact with the walls of these annular grooves via circumferential seals 41, 42.

The controller 40 operates the axial displacement of the rings 33, 34 such that a gradual decrease in oil pressure on one of the rings 33, 34 is accompanied by a gradual increase in the oil pressure on the other ring. Hereby one clutch starts to slip until it is disengaged from the rotating shaft 15, while the other clutch starts to slip and engages the rotating shaft 15 until it is in a fixed angular position relative to the shaft 15. In this way, a smooth transition of the torque that is exerted on the shaft 15 from one gear 8,9 to the other is effected.

Figure 3:
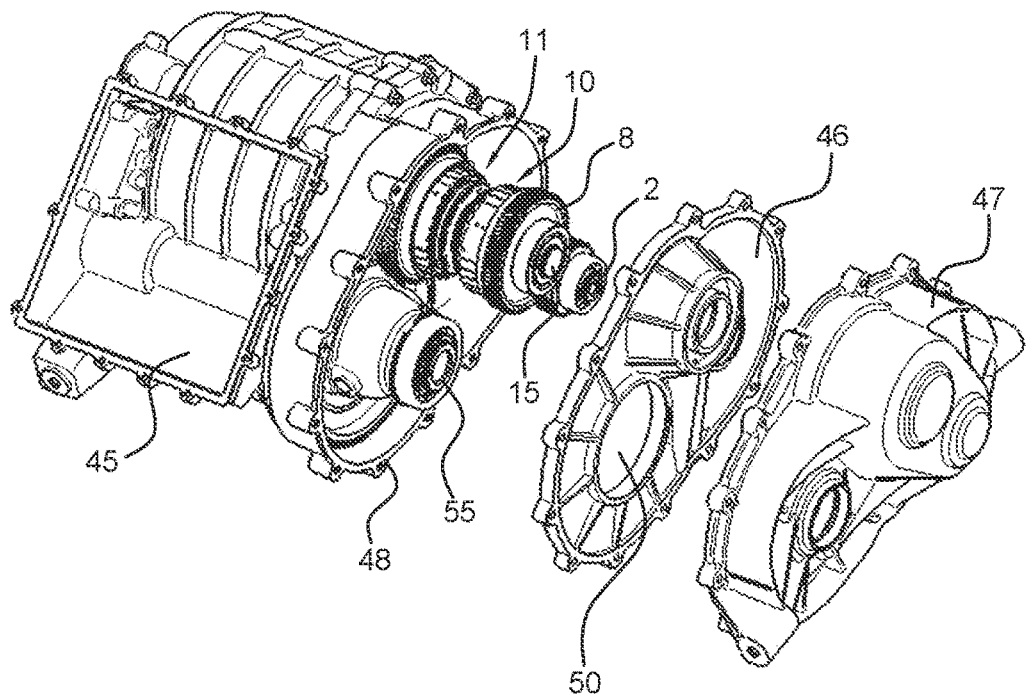
FIG. 3 shows a perspective view of the housing of the electromotor and the gear assembly interconnected via an interconnecting plate according to the disclosure.
Figure 4A:
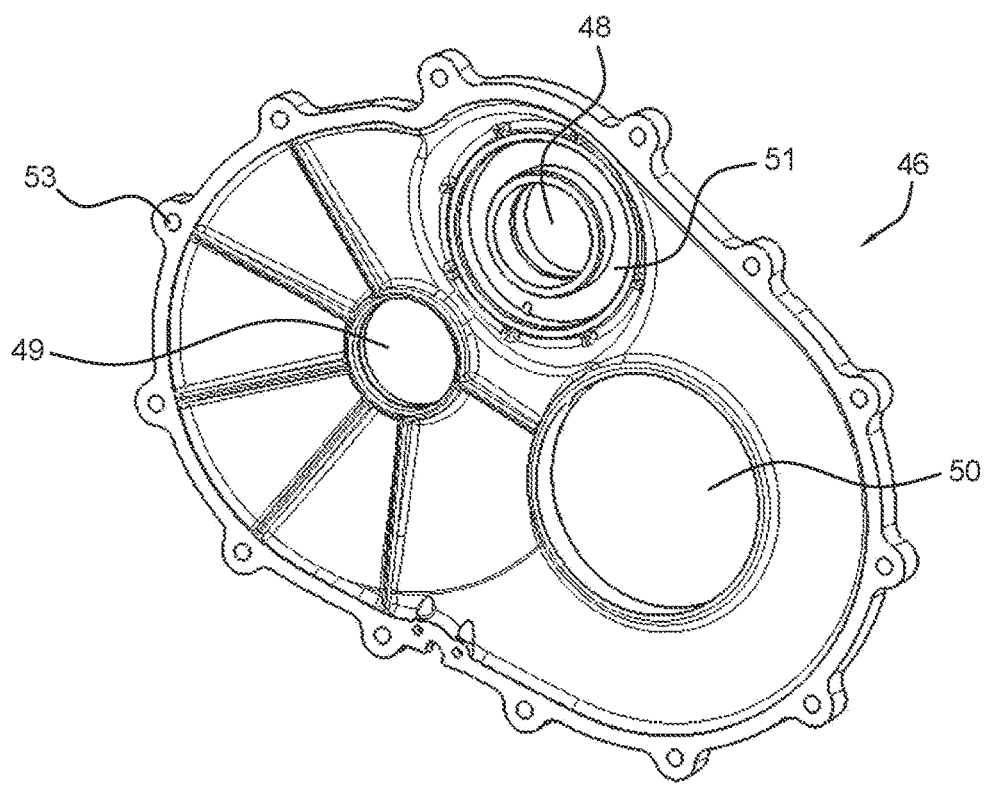
FIGS. 4a and 4b show perspective views of the interconnecting plate according to the disclosure.

FIG. 3 shows the motor housing 45, the gear box housing 47 and the interconnecting plate 46 that is connected at the interface 44 via bolts that are interconnecting the housing parts 45, 47. As shown in FIG. 4a, the interconnecting plate 46 is at the side facing the motor housing 45 provided with an annular groove 51 for accommodating the ring 34 of the clutch 11. The drive shaft 2 passes through the hole 49, whereas the intermediate shaft 15 passes through opening 48 and opening 50 accommodates the output shaft 55. At the interface 44, holes 53 are provided along the circumference of the plate 46 for receiving connecting bolts interconnecting the housing parts 45,47.

Figure 4B:
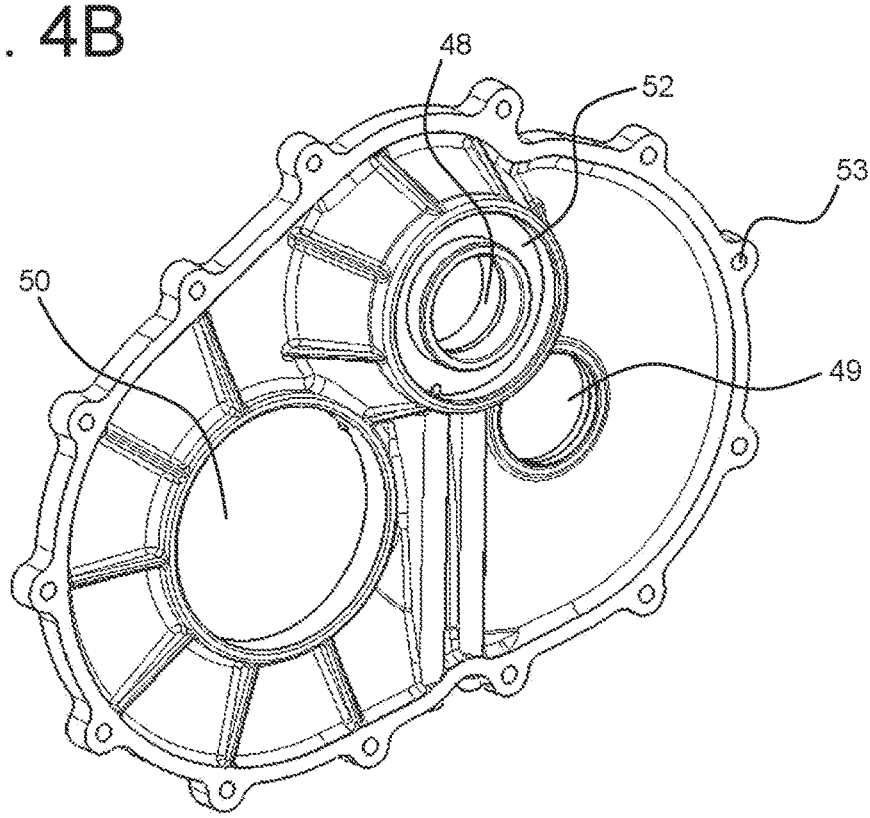

As shown in FIG. 4b, the interconnecting plate 46 is at the outward facing side provided with an annular groove 52 for accommodating the ring 33 of the clutch 10.

Figure 5:
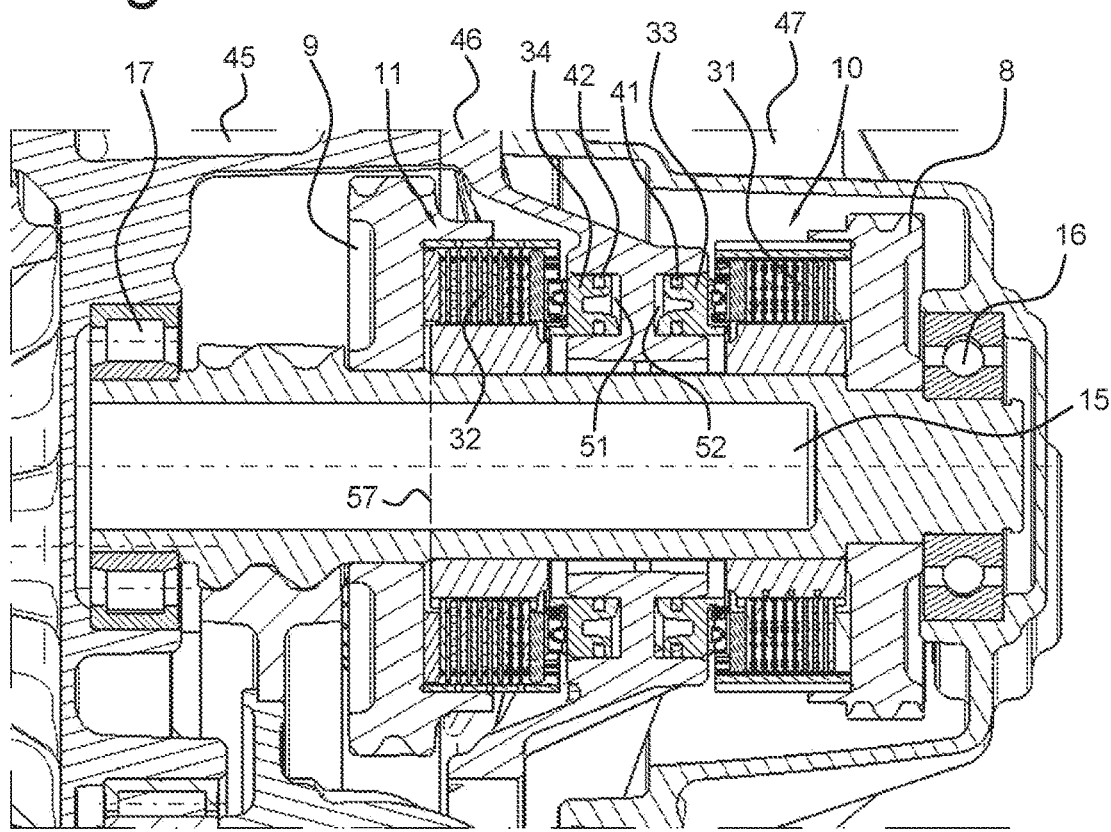
FIG. 5 shows a partial cross-sectional view of the gear assembly of FIG. 1.

FIG. 5 shows the clutches 10,11 being situated closer to a midpoint 57 of the shaft 15 whereas the gears 8,9 are situated closer to the bearings 16,17 near the end points of the shaft.

While the disclosure has been described with reference to exemplary embodiments, it will be understood by those skilled in the art that various changes may be made and equivalents may be substituted for elements thereof without departing from the scope of the disclosure. The controller disclosed can include a special purpose computer (which could include one or more processors and/or memory) programmed to perform the required steps. In addition, many modifications may be made to adapt a particular situation or material to the teachings of the disclosure without departing from the essential scope thereof. Therefore, it is intended that the disclosure not be limited to the particular or preferred embodiments disclosed, but that the disclosure will include all embodiments falling within the scope of the appended claims.

The invention claimed is:

1. A gear assembly for use with an electric motor, comprising: a shaft with a rotatable gear both on a first end and on a second end, each gear connected to respectively a first and second clutch, each clutch having a first clutch member fixedly connected to the gear and the first clutch member being connectable to a second clutch member extending around the shaft and connected to the shaft in a fixed angular position, a force member being axially situated between the first and second clutch and configured for axially moving the second clutch member of each clutch relative to the first clutch member of the respective clutch in an axial direction such that for each clutch the first clutch member and the second clutch member can engage and disengage in a slipping manner at relative circumferential speeds, wherein the force member comprises a hydraulic actuator for each second clutch member, wherein the gear assembly is disposed in a housing having a first housing segment and a second housing segment and an interconnecting plate situated at an interface between the housing segments, the interconnecting plate supporting the hydraulic actuators.

2. The gear assembly according to claim 1, the shaft being supported by bearings at each end of the shaft near a respective gear.

3. The gear assembly according to claim 1, wherein the gears are mounted on the shaft with a clearance fit so they can freely rotate around the shaft.

4. The gear assembly according to claim 1, each second clutch member extending around the shaft and being situated closer to a midpoint of the shaft than the respective gears.

5. The gear assembly according to claim 1, further comprising a controller such that one of the second clutch members engages its corresponding first clutch member while the other of the second clutch members disengages from its corresponding first clutch member such that a transfer of torque from the gears to the shaft is substantially constant.

6. The gear assembly according to claim 1, wherein the hydraulic actuators comprise a ring-shaped groove in the interconnecting plate.

7. The gear assembly according to claim 1, wherein the interconnecting plate comprises ring-shaped grooves and oil channels connecting to the grooves, wherein the ring shaped groves and oil channels are formed in the interconnecting plate.

8. An electric vehicle, comprising:
an electric motor; and
a gear assembly, comprising:
a shaft with a rotatable gear both on a first end and on a second end, each gear connected to respectively a first and second clutch, each clutch having a first clutch member fixedly connected to the gear and the first clutch member being connectable to a second clutch member extending around the shaft and connected to the shaft in a fixed angular position, a force member being axially situated between the first and second clutch and configured for axially moving the second clutch member of each clutch relative to the first clutch member of the respective clutch in an axial direction such that for each clutch the first clutch member and the second clutch member can engage and disengage in a slipping manner at relative circumferential speeds, wherein the force member comprises a hydraulic actuator for each second clutch member, wherein the gear assembly is disposed in a housing having a first housing segment and a second housing segment and an interconnecting plate situated at an interface between the housing segments, the interconnecting plate supporting the hydraulic actuators.

9. The electric vehicle according to claim 8, the shaft being supported by bearings at each end of the shaft near a respective gear.

10. The electric vehicle according to claim 8, wherein the gears are mounted on the shaft with a clearance fit so they can freely rotate around the shaft.

11. The electric vehicle according to claim 8, each second clutch member extending around the shaft and being situated closer to a midpoint of the shaft than the respective gears.

12. The electric vehicle according to claim 8, wherein the gear assembly further comprises a controller such that one of the second clutch members engages its corresponding first clutch member while the other of the second clutch members disengages from its corresponding first clutch member such that a transfer of torque from the gears to the shaft is substantially constant.

13. The electric vehicle according to claim 8, wherein the hydraulic actuators comprise a ring-shaped groove in the interconnecting plate.

14. The electric vehicle according to claim 8, wherein the interconnecting plate comprises ring-shaped grooves and oil channels connecting to the grooves, wherein the ring shaped groves and oil channels are formed in the interconnecting plate.

* * * * *